3,169,947
PROCESS FOR THE ADDITION POLYMERIZATION OF VINYLIDENE COMPOUNDS IN THE PRESENCE OF TRIALKYL BORON OR A MIXTURE OF TRIALKYL BORON AND OXYGEN
Rudolf Stroh, Leverkusen-Bayerwerk, Wilhelm Sutter, Leverkusen, and Hans Haberland, Leverkusen-Bayerwerk, Germany, assignors to Farbenfabriken Bayer Aktiengesellschaft, Leverkusen, Germany, a corporation of Germany
No Drawing. Filed July 1, 1957, Ser. No. 668,860
Claims priority, application Germany, July 14, 1956, F 20,798
12 Claims. (Cl. 260—85.5)

This invention relates to a process for the polymerization of organic compounds having aliphatic carbon-to-carbon unsaturation.

The surprising observation has been made that boron trialkyls are valuable initiators for the polymerization of organic compounds having aliphatic carbon-to-carbon unsaturation.

Examples of such unsaturated compounds are butadiene, isoprene, dimethylbutadiene, chlorobutadiene, styrene, α-methylstyrene, styrenes substituted in the benzene nucleus by halogen or alkyl groups, divinylbenzene, acrylonitrile, acrylic acid and esters thereof, methacrylic acid and esters thereof, such as methylmethacrylate, butylacrylate, dodecylacrylate, vinyl esters such as vinylacetate, vinylchloride, asym. dichloroethylene, isobutylene and other unsaturated compounds containing one or more ethylenic double bonds which can be polymerized by conventional polymerization methods with the aid of radical-forming catalysts. It is also possible for mixtures of the said unsaturated organic compounds including mixtures of liquid ethylenically unsaturated polyesters to be co-polymerized by the process of this invention. The polymerization of the aforementioned compounds may be carried out in bulk, in solution, suspension and emulsion at ordinary pressure or under increased pressure.

In the case of monomers which are gaseous at normal temperature they can be polymerized whilst liquefied under pressure.

Examples of solvents which may be used are hydrocarbons, such as cyclohexane, benzene or toluene, chlorinated hydrocarbons, such as chlorobenzene, ethylenechloride, methylenechloride, chloroform, ether, such as dibutylether, dioxane, tetrahydrofurane, ketones, such as acetone, cyclohexanone, and also those solvents in which the high polymers formed will be maintained in solution, for example dimethyl formamide in which polymeric acrylonitrile is soluble. It has surprisingly been found that polymerization according to the process of this invention can also take place in alcohols, water and other solvents containing hydroxyl groups.

Among the boron trialkyls which may be used as polymerization catalysts according to the invention, boron trimethyl, boron triethyl, boron triisopropyl, boron triisobutyl, boron triamyl, boron tridodecyl, boron trioctodecyl and tricyclohexyl may be mentioned by way of example. These initiators may be applied in amounts of 0.1–10% as calculated on the weight of monomers.

The polymerization process can be carried out by adding boron trialkyl dropwise and slowly to the monomer to be polymerized. Alternatively, however, the monomer to be polymerized may be introduced slowly into a prepared solution of the boron trialkyl. According to one particular form of the invention, it has proved to be advisable to carry out the polymerization in the presence of oxygen. The simplest technical form consists in causing a slow current of air to bubble through the reaction mixture. In order that the polymerization takes place under conditions which can be controlled from the outset, it is advisable first of all to work whilst excluding air and to flush out the reaction vessel beforehand with nitrogen. The polymerization generally starts after a short induction period. The temperature to be maintained depends on the readiness with which the monomer or monomers can be caused to polymerize. Generally speaking, temperatures between $-10°$ C. and $70°$ C. are applicable, although other temperatures are also suitable.

Working up is effected in the usual manner by separating the polymer from the solvent, where it is not already available in the form required for use.

The polymerized compounds can be used in known manner as elastomers, and as initial materials for the manufacture of threads, films, plastic compounds and the like. Thus, for example, it is possible according to the present invention to obtain a polymeric acrylonitrile which can be worked up into fibres having excellent textile properties both in the wet-spinning and dry-spinning processes.

Moreover, polymeric acrylonitrile prepared in dimethyl formamide can be spun directly in the same manner without it being necessary first of all to isolate the polymer in the solid condition and then redissolve it.

*Example 1*

A solution of 100 parts by volume of acrylonitrile in 100 parts by volume of cyclohexane is added dropwise within 2½ hours to 20 parts by volume of a 2.5% solution of boron triethyl in cyclohexane, after the air has been displaced by nitrogen.

At the same time, a slow current of air is conducted through the vessel. The temperature in the mixture is kept constant at $30°$ C. After completing the dropwise addition, stirring is continued for several hours, and the polymer is then separated out, filtered, washed with cyclohexane and dried at $50°$ C. in vacuo. The pure white product provides in dimethyl formamide a colourless solution which can be spun in wet and dry forms to provide threads having good textile properties.

*Example 2*

Instead of the pure acrylonitrile used in Example 1, a mixture of 95 parts by weight of acrylonitrile and 5 parts by weight of acrylic acid methyl ester is employed. Under the same polymerization conditions, a polymer which has similar properties to those mentioned in Example 1 is obtained.

*Example 3*

100 cc. of a 10 percent solution of methylmethacrylate in tetrahydrofurane are mixed with 1 cc. of an 8 percent solution of boron triethyl in tetrahydrofurane under exclusion of air. Thereafter air is passed through the solution which causes a slight raise in temperature. After 1–2 hours the polymer formed is precipitated by addition of methanol. The precipitate is boiled with methanol and dried in vacuo at 60–80° C. The intrinsic viscosity $[\eta]$ (in chlorobenzene) is 0.60, the K-value according to Fikentscher$=52$ (compare Cellulosechemie, 13 (1932), page 60).

If di-n-butylether is used as a solvent the polymer has an intrinsic viscosity $[\eta]=0.58$ and a K-value$=50.8$. In case that boron tricyclohexyl is used as an initiator, the polymer has an intrinsic viscosity $[\eta]=0.65$ and a K-value$=58.0$.

*Example 4*

Instead of the acrylonitrile used in Example 1, 1.1-dichloroethylene is employed as monomer. The polymer obtained has an intrinsic viscosity $[\eta]=0.11$ (in dioxane) and a K-value$=30.8$.

Example 5

The process of Example 1 is carried out while using equal parts of methyl methacrylate and styrene as monomers. The resulting copolymer has an intrinsic viscosity $[\eta]=0.68$ and a K-value=61.

Example 6

0.3 cc. of boron triethyl are added under exclusion of air to 25 g. of methylmethacrylate. Air is passed over the reaction mixture. The polymerization starts immediately and results in a hard resin.

Example 7

75 g. of styrene and 25 g. of acrylonitrile are mixed under exclusion of air with 0.75 g. of boron trihexyl. The mixture is run into a reaction vessel containing a solution of 2 g. of sodium stearate in 500 cc. of water which is kept at 40–50° C. within 5 hours while stirring and passing air through the solution. There is obtained a copolymer latex which is coagulated with sodium chloride solution. The coagulate is washed with water, treated with water steam and dried at 50–60° C. in vacuo. There results a white powder with an intrinsic viscosity $[\eta]=1.22$ and a K-value=85 (measured in dimethyl formamide solution).

What we claim is:

1. A process for the polymerization of a polymerizable vinylidene monomer which comprises contacting said vinylidene monomer with a catalyst consisting of a boron trialkyl of 1–18 carbon atoms per alkyl radical in admixture with catalytic amounts of molecular oxygen, thereby causing said vinylidene monomer to polymerize.

2. The process of claim 1 wherein the polymerization is carried out by the bulk method.

3. The process of claim 1 wherein the polymerization is carried out in solution.

4. The process of claim 1 wherein the polymerization is conducted in aqueous solution.

5. The process of claim 1 wherein at least two of said vinylidene monomers are copolymerized.

6. The process of claim 1 wherein the boron trialkyl has the formula $B(R)_3$ wherein R contains 1–6 carbon atoms and is selected from the group consisting of alkyl and alicyclic.

7. A process for the polymerization of an organic ester containing a single terminal ethylenic double bond which process comprises polymerizing said ester in contact with a trialkyl boron catalyst and in the presence of added gaseous oxygen as co-catalyst.

8. A process for the polymerization of a polymerizable vinylidene monomer which comprises conducting the polymerization in the presence of a catalyst consisting of a boron trialkyl of the formula $B(R)_3$ wherein R contains 1 to 18 carbon atoms, initiating the polymerization in the absence of oxygen, and subsequently introducing oxygen in catalytic amounts into the polymerization medium after polymerization has started, thereby causing said unsaturated compound to polymerize.

9. A process for the polymerization of a polymerizable vinylidene monomer selected from the group consisting of butadiene, isoprene, dimethyl butadiene, chlorobutadiene, styrene, alpha-methyl styrene, alkyl-substituted styrene, halogen-substituted styrene, divinyl benzene, acrylonitrile, acrylic acid, and alkyl esters thereof, methacrylic acid and alkyl esters thereof, vinyl acetate, vinyl chloride, dichloroethylene, and isobutylene which comprises contacting said vinylidene monomer with a catalyst consisting of a boron trialkyl of 1–18 carbon atoms per alkyl radical.

10. Process of claim 9 wherein the catalyst has the formula $B(R)_3$ wherein R contains 1–6 carbon atoms and is selected from the group consisting of alkyl and alicyclic, the catalyst being present in an amount of 0.1–10% by weight based on the weight of said monomer.

11. A process for the polymerization of acrylonitrile which comprises contacting acrylonitrile with a catalyst consisting of a boron trialkyl of 1 to 18 carbon atoms per alkyl radical.

12. Process of claim 11 wherein the catalyst has the formula $B(R)_3$ wherein R contains 1 to 6 carbon atoms and is selected from the group consisting of alkyl and alicyclic, the catalyst being present in an amount of 0.1–10% by weight based on the weight of monomer.

References Cited in the file of this patent

UNITED STATES PATENTS

| | | |
|---|---|---|
| 2,234,581 | Rosen | Mar. 11, 1941 |
| 2,276,094 | Rothrock | Mar. 10, 1942 |
| 2,387,517 | Kraus | Oct. 23, 1945 |
| 2,617,783 | Slocombe et al. | Nov. 11, 1952 |
| 2,685,575 | Heiligmann et al. | Aug. 3, 1954 |
| 2,721,189 | Anderson et al. | Oct. 18, 1955 |
| 2,840,551 | Field | June 24, 1958 |
| 2,985,633 | Welch | May 23, 1961 |

OTHER REFERENCES

Kolesnikov et al.: Bulletin of the Academy of Sciences of the USSR, Division of Chemical Science, pages 251–252, February 1957, published by Consultants Bureau Inc., New York, N.Y.

Kolesnikov et al.: Izvest. Nauk. USSR, Otdel Khem. Nauk, 1957, pages 236–237.

Kolesnikov et al.: As above, Bull. Ac. of Sci., pages 666–667, May 1957.

Kolesnikov et al.: As above, Izvest. Nauk., pages 652–653, 1957.

Meerwein: "Catalytic Decomposition of Diazomethane to Polymethylene," Angew. Chem., A60, 78 (1948), abstracted in Chem. Abstracts, page 9723H, 1950.